United States Patent
Cohn et al.

(10) Patent No.: US 9,860,079 B2
(45) Date of Patent: Jan. 2, 2018

(54) REDIRECTING PACKETS FOR EGRESS FROM AN AUTONOMOUS SYSTEM USING TENANT SPECIFIC ROUTING AND FORWARDING TABLES

(71) Applicant: Oracle International Corporation, Redwood Shores, CA (US)

(72) Inventors: Dan Cohn, Oakland, CA (US); Jag Brar, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 237 days.

(21) Appl. No.: 14/947,921

(22) Filed: Nov. 20, 2015

(65) Prior Publication Data

US 2017/0149582 A1  May 25, 2017

(51) Int. Cl.
*H04L 12/26* (2006.01)
*H04L 12/46* (2006.01)
*H04L 12/741* (2013.01)
*H04L 12/66* (2006.01)

(52) U.S. Cl.
CPC .......... *H04L 12/4633* (2013.01); *H04L 12/66* (2013.01); *H04L 45/74* (2013.01)

(58) Field of Classification Search
CPC . H04L 12/4641; H04L 12/4633; H04L 12/66; H04L 45/174; H04L 45/54
See application file for complete search history.

(56) References Cited

U.S. PATENT DOCUMENTS

2011/0213870 A1* 9/2011 Cai .......................... H04L 67/10
709/223
2013/0287026 A1* 10/2013 Davie ...................... H04L 49/70
370/392

* cited by examiner

*Primary Examiner* — Kevin C Harper
(74) *Attorney, Agent, or Firm* — Invoke (57) ABSTRACT

A redirector within an Autonomous System (AS) is configured to access a set of Routing and Forwarding (RF) tables associated with a respective set of tenants. A current packet, addressed to a private IP address of a private tenant network outside the AS, is received by the redirector. The redirector executes a look up of the private IP address in a RF table, from the set of RF tables, that corresponds to the tenant associated with the packet. The redirector selects an egress interface of a egress gateway of the AS based on the look up. The redirector encapsulates the current packet and an identifier of the egress interface within an outer packet and transmits the outer packet to the egress gateway. The egress gateway transmits the packet toward the private IP address of the private tenant network using the egress gateway selected by the redirector.

20 Claims, 8 Drawing Sheets

REDIRECTING PACKETS FOR EGRESS FROM AN AUTONOMOUS SYSTEM USING TENANT SPECIFIC ROUTING AND FORWARDING TABLES

INCORPORATION BY REFERENCE

Each of the following documents are hereby incorporated by reference:
(a) Rekhter, et al. "A Border Gateway Protocol 4 (BGP-4)." Request For Comments (RFC) 4271. The Internet Society. January 2006.
(b) Mahalingam, et al. "Virtual eXtensible Local Area Network (VXLAN): A Framework for Overlaying Virtualized Layer 2 Networks over Layer 3 Networks." Request For Comments (RFC) 7348. IETF Trust. August 2014.
(c) Worster, T. et al. "Encapsulating MPLS in IP or Generic Routing Encapsulation (GRE)." Request For Comments (RFC) 4023. The Internet Society. March 2005.
(d) Durham, Ed., et al. "The COPS (Common Open Policy Service) Protocol." Request For Comments (RFC) 2748. The Internet Society. January 2000.
(e) Dommety, G. "Key and Sequence Number Extensions to GRE." Request For Comments (RFC) 2890. The Internet Society. September 2000.
(f) U.S. patent application Ser. No. 14/799,938 filed on Jul. 15, 2015.
(g) U.S. patent application Ser. No. 14/799,951 filed on Jul. 15, 2015.

TECHNICAL FIELD

The present disclosure relates to autonomous systems with multiple egress gateways, each multiple egress interfaces. In particular, the present disclosure relates to techniques for redirecting packets towards an egress gateway, of an autonomous system, that is selected using one of a set of Routing and Forwarding (RF) tables associated with a respective set of tenants.

BACKGROUND

One way of looking at the entire Internet routing architecture is a set of domains where within each domain there is an internal routing environment. Each domain is a single administrative domain, operated within a uniform set of routing policies, and is operated independently from any other domain. The domain is in effect an autonomous unit in the overall routing architecture, and is termed an Autonomous System (AS). Each particular AS appears to other as—to have a single coherent internal routing plan and presents a consistent picture of what destinations are reachable through the particular AS. Each of these as—is uniquely identified using an Autonomous System Number (ASN). An ASN could be assigned, for example, to a tenant, a network service provider (NSP), a large company, a university, a division of a company, or a group of companies.

A particular AS may be implemented as a private tenant network. A private tenant network is a private network of devices associated with a particular tenant such as, for example, a company, business entity, governmental entity, school, or individual. A private network is a network that uses private IP address space, following the standards set by RFC 1918 for Internet Protocol Version 4 (IPv4), and RFC 4193 for Internet Protocol Version 6 (IPv6).

The inter-domain routing environment describes how domains interconnect, but avoids the task of maintaining transit paths within each domain. In the inter-domain space, a routing path to an address is described as a sequence of domains that must be transited to reach the domain that originates that particular address prefix. Today this inter-domain space is maintained using Version 4 of the Border Gateway Protocol (BGPv4), RFC 4271.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.
1. GENERAL OVERVIEW
2. ARCHITECTURAL OVERVIEW
3. ENCAPSULATING AND DECAPSULATING PACKETS
4. REDIRECTING PACKETS IN AN AUTONOMOUS SYSTEM TO AN EGRESS GATEWAY
5. MISCELLANEOUS; EXTENSIONS
6. HARDWARE OVERVIEW 1. General Overview In an embodiment, applications and/or virtual machines execute on devices within an Autonomous System (AS) corresponding to a multi-tenant environment. The applications and/or virtual machines manage data and/or operations for multiple tenants. Each of the multiple tenants are associated with one or more respective private tenant networks outside of the AS. Packets from the AS that are destined for a device in a private tenant network are transmitted to a redirector within the AS. For example, a gateway within the AS encapsulates (a) a current packet destined for the device in the private tenant network and (b) information identifying the tenant corresponding to the current packet within a first outer packet. The gateway then transmits the first outer packet to the redirector within the AS.

In an embodiment, the redirector within the AS receives and decapsulates the encapsulated first outer packet to obtain (a) the particular packet that is destined for the device in the private tenant network outside of the AS and (b) information identifying the tenant corresponding to the particular packet. The redirector selects a Routing and Forwarding (RF) table corresponding to the identified tenant from a set of multiple RF tables corresponding to a respective set of tenants. The redirector performs a lookup within the selected RF table corresponding to the identified tenant using a destination address (or other information) within the current packet. The lookup by the redirector results in identification of a tenant network router, in the private tenant network, that is an intermediate destination toward the destination address. A second lookup of the tenant network router in another table results in identification of a particular egress interface (e.g., port or tunnel endpoint) of an egress gateway. The egress gateway is selected for transmitting the particular packet out of the AS. Alternatively, the selected RF table may directly map the destination address within the current packet to the particular egress interface of the selected egress gateway.

In an embodiment, the redirector encapsulates (a) the current packet and (b) information identifying the particular egress interface of the selected egress gateway within a second outer packet. The redirector transmits the second outer packet to the selected egress gateway.

In an embodiment, the selected egress gateway receives the second outer packet from the redirector. The selected egress gateway decapsulates the second outer packet to obtain (a) the particular packet and (b) information identifying the particular egress interface of the egress gateway. The selected egress gateway transmits the particular packet out of the AS using the particular egress interface. The particular packet is transmitted by the selected egress gateway toward the destination device in the private tenant network.

One or more embodiments described in this Specification and/or recited in the claims may not be included in this General Overview section.

2. Architectural Overview

Figure 1A:
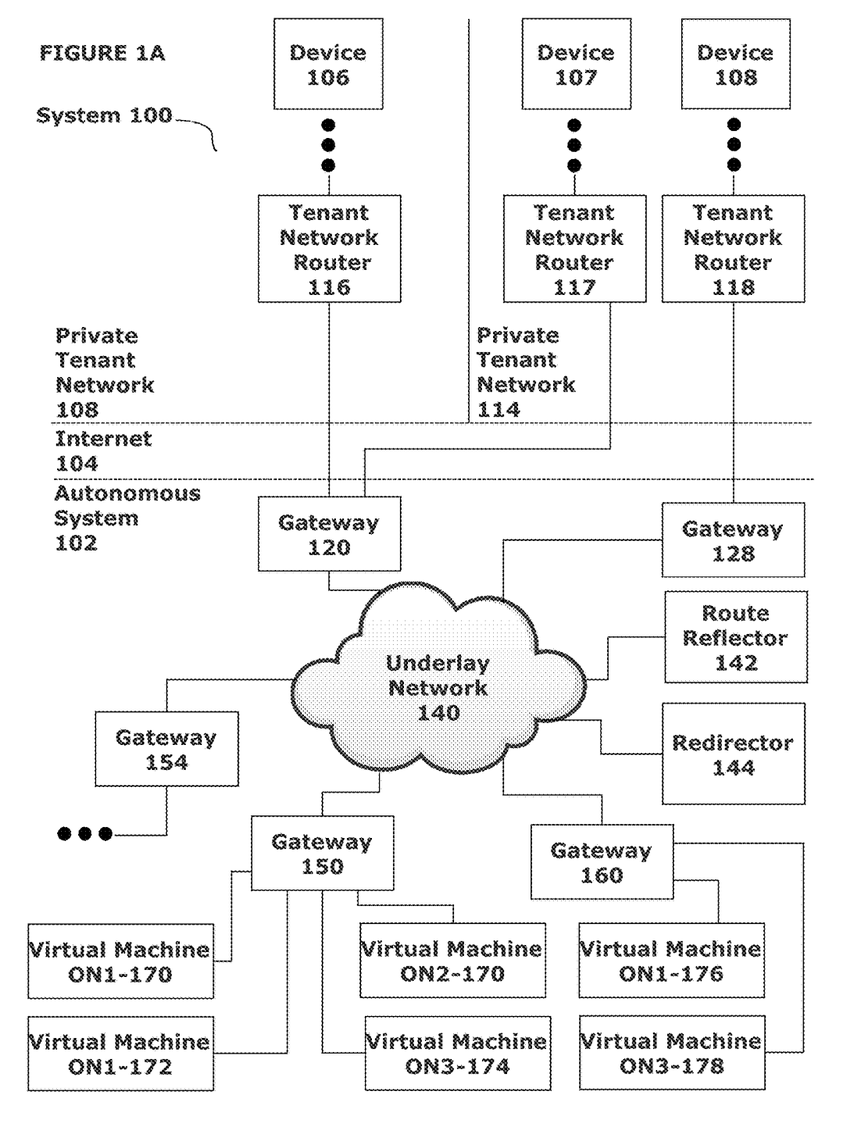
FIGS. 1A-1C illustrate a system in accordance with one or more embodiments.

FIG. 1A illustrates an example of a system 100 in accordance with one or more embodiments. Other embodiments may include more or less devices and more or less components than illustrated in system 100 and/or described below. Hardware components, software components, and/or functionality described as corresponding to one device may instead correspond to another device. Components illustrated separately may be combined into a single component or implemented on a single device Links between components and/or devices may be direct links, links over an Intranet, links over the Internet, links over private networks, or link over any other set of devices. Accordingly, the scope of the claims should not be construed as being limited by the specific examples herein.

Devices within System 100 may be referred to as compute nodes. A compute node is any device that includes at least one hardware processor and functionality to execute operations using the hardware processor. A single compute node may concurrently execute multiple operating systems and/or applications.

System 100 illustrates devices inside of AS 102, devices inside of a private tenant network 108, and devices inside of a private tenant network 114. While two private tenant networks are illustrated for purposes of explanation, any number of private tenant networks may be implemented in accordance with one or more embodiments. It is well understood that any number of devices (not shown) on the Internet 104 may be involved in transmitting messages between the AS 102 and either private tenant network 108 or private tenant network 114. Furthermore, communication links between AS 102 and any private tenant network (e.g., a link between gateway 120 and tenant router 116) may be direct links (not over the Internet), links over an Intranet, links over other autonomous systems, links over the Internet 104, links over a IPsec VPN tunnel, and/or links over any set of devices/components. Accordingly, the illustration of Internet 104 should not be construed as a requirement of the links to be implemented over the Internet.

In this illustrative example, device 106 and tenant network router 116 are located within private tenant network 108. In addition to being located within the private tenant network 108, the tenant network router 116 may further be associated with a public IP address that is routable from outside of the private tenant network 108. Device 107, device 108, tenant network router 117, and tenant network router 118 are located within private tenant network 118. Any private tenant network may include any number of tenant network routers. Multiple tenant network routers (e.g., tenant network routers 117 and 118) within private tenant network 114 may be communicatively coupled to AS 102 for redundancy and failure recovery.

Gateways 120, 128, 150, 154, and 160 are located inside AS 102. In addition, Route Reflector (RR) 142 and redirector 144 are implemented within AS 102. Virtual Machines (VMs) ON1-170, ON1-172, ON2-170, ON3-174, ON1-176, and ON3-178 are executed on compute nodes and are communicatively coupled with the gateways (which may be executed on the same or separate devices). Gateways and virtual machines may be implemented across various compute nodes without restriction. In one example, virtual machine ON1-170 is executed on a compute node that is reachable via gateway 150 being executed on a commodity router separate from the compute node. In another example, virtual machine ON2-170 and virtual machine ON3-174 are reachable via gateway 150 and executed on the same device as gateway 150.

In an embodiment, devices within AS 102 are connected by underlay network 140. Underlay network 140 is made up of networking devices such as switches, routers, and hubs. Routers within the underlay network 149 may be local routers/commodity routers that include functionality to determine a next hop toward a destination within AS 102. Some commodity routers do not have the functionality and/or processing power to compute a next hop based on destinations on the Internet 104. In one example, a commodity router routes an encapsulated packet to a gateway identified in the outer header of the encapsulated packet without identifying or using an inner header of an inner packet stored in the payload of the encapsulated packet. The encapsulation of the inner packet addressed to an Internet destination and the addressing of the encapsulated packet to a destination within AS 102 advantageously obviates the need of underlay network routers to route packets based on destinations on the Internet 104.

Underlay network 140 may be implemented using any routing protocol and device addressing scheme. In one example, which should not be construed as limiting the scope of the claims, underlay network 140 is an Open Systems Interconnection (OSI) Layer 3 network in which packets are forwarded toward destination IP addresses included within packet headers. When a packet being forwarded is an encapsulated packet with an outer header corresponding to an outer packet and an inner header corresponding to an inner packet, the outer header is used to determine the next hop within underlay network 140.

Non-blocking performance in underlay network 140 may be achieved by connecting each gateway device (for example, gateway 120 and gateway 150) to every core device within underlay network 140 in a full-mesh topology. For example, gateway devices 120 and 150 and core devices within underlay network 140 may be arranged in a Clos or folded Clos (i.e., fat-tree) network topology, which allows underlay network 140 to be scaled using small, inexpensive devices with the performance and redundancy of larger, more expensive devices.

In an embodiment, AS 102 corresponds to a multi-tenant environment for storing data and executing operations for multiple tenants. AS 102 is configured to prevent a tenant from accessing data corresponding to other tenants. Tenant isolation within AS 102 is implemented using overlay networks. Each overlay network is a virtual network implemented over the underlay network 140. An overlay/virtual network for each tenant is isolated from overlay/virtual networks for other tenants. Entities within the overlay/virtual network communicate with each other using virtual tunnels (also referred to as "encapsulation tunnels"). RFC 7348 titled "Virtual eXtensible Local Area Network (VXLAN): A Framework for Overlaying Virtualized Layer 2 Networks over Layer 3 Networks" describes one example method for overlaying a virtual network over an underlay network. Specifically, RFC 7348 describes an example of a framework for overlaying a virtual Layer 2 network over an OSI Layer 3 network.

In another example, Generic Routing Encapsulation (GRE) protocol may be used as a framework for overlaying a virtual network over an underlay network. In this example, encapsulation and decapsulation for implementing virtual tunnels is performed in accordance with the GRE protocol (see for example, RFC 2784 and 2890). In another example, an OSI Layer 3 packet may be encapsulated within an outer Layer 3 packet for transmission across an underlay network.

Continuing with FIG. 1A, each overlay network is associated with a respective set of one or more virtual machines for storing data and executing operations. A particular tenant may access VMs on the overlay network corresponding to that particular tenant. However, that particular tenant is prevented from accessing VMs on overlay networks corresponding to other tenants. In the illustrated example, device 108 corresponds to a user device of a first tenant (associated with private tenant network 114) which is assigned an overlay network ON1. ON1 is associated with virtual machines ON1-170, ON1-172, and ON1-176 which are all accessible to the first tenant. A second overlay network ON2 is associated with a virtual machine ON2-170 which is inaccessible to the first tenant. A third overlay network ON3 is associated with virtual machines ON3-174 and ON3-178 which are inaccessible to the first tenant.

A message may be transmitted to an entity associated with an overlay network by addressing the message to a device with an address in the underlay network 140 that is communicatively coupled to the entity in the overlay network. In an example, virtual machine ON1-170 is an entity in an overlay network ON1. A message addressed to an identifier "170" (overlay network address) in overlay network "ON1" is transmitted to the IP address (underlay network address) corresponding to gateway 150. Gateway 150 is communicatively coupled with virtual machine ON1-170 and may deliver the message to virtual machine ON1-170.

In this illustrative example, ON1-170 and ON2-170 have a same identifier ("170") but are differentiated based on the overlay network to which they belong—ON1 and ON2, respectively. Messages addressed to identifier "170" are transmitted to ON1-170 if a source of the message is associated with ON1. Messages addressed to identifier "170" are transmitted to ON2-170 if a source of the message is associated with ON2. An identifier may correspond to a (Media Access Control) MAC address of a device. Multiple virtual machines may share the same MAC address (or other identifier) as long as they are on different overlay networks.

In an example, a tenant may correspond to a particular business entity, BigCo Analytics. BigCo Analytics is a division of the company, BigCo. BigCo Analytics is associated with multiple user devices which are allowed to access data associated with BigCo Analytics. The data and related operations for BigCo Analytics are managed by a set of virtual machines on an overlay network assigned to BigCo Analytics. In this particular example, the user devices associated with BigCo Analytics are isolated from and prohibited from communicating with virtual machines on a second overlay network corresponding to another division of BigCo, BigCo Automotive. The user devices associated with BigCo Analytics are also isolated from and prohibited from communicating with virtual machines on a third overlay network corresponding to another tenant, WhiteAcre Properties (not affiliated with BigCo). While the above example relates to business entities, a tenant may simply correspond to an individual user, such as "Bob Smith".

Continuing with FIG. 1A, AS 102 includes a set of gateways. A gateway corresponds to a hardware and/or software component with functionality to forward packets. In an example, a gateway is a programmable Top Of Rack (TOR) switch, within AS 102, that is physically connected to a set of compute nodes executing virtual machines. A gateway may perform one or more processing functions for received packets. Examples of processing functions include, but are not limited to, filtering packets, redirecting packets, translating packets (for example, Network Address Translation), encrypting packets, decrypting packets, encapsulating packets, and decapsulating packets.

In one embodiment, gateways within AS 102 include different components, different data sets, and/or different functionality. For example, a first set of gateways, including Gateway 120, include functionality for transmitting packets out of AS 102 toward destinations on private tenant networks 108 and 114. Gateways that include functionality to transmit packets out of the AS 102 and directly to at least one device external to AS 102 are referred to herein as "edge gateways." The devices that are external to AS 102 and directly connected to at least one of the edge gateways of AS 102 are referred to herein as "logical peers" of AS 102. A logical peer may also refer to a business entity associated with the devices external to the AS 102 and directly connected to one of the edge gateways. The logical peers are typically the first hop or first intermediate destination for packets being transmitted out of AS 102 toward a final destination. In the illustrative example, tenant network router 116 corresponds to or is itself a logical peer of AS 102. Tenant router 116 is communicatively coupled (directly or indirectly) to gateway 120.

A second set of gateways, including gateway 150, include functionality for transmitting packets toward destinations within AS 102 (as a final destination or an intermediate destination toward a final destination on the Internet) but may not necessarily have functionality to transmit a packet directly to a destination outside of AS 102. In an embodiment, gateway 150 is configured to transmit packets to redirector 144 as described below with reference to FIG. 3A.

Figure 1B:
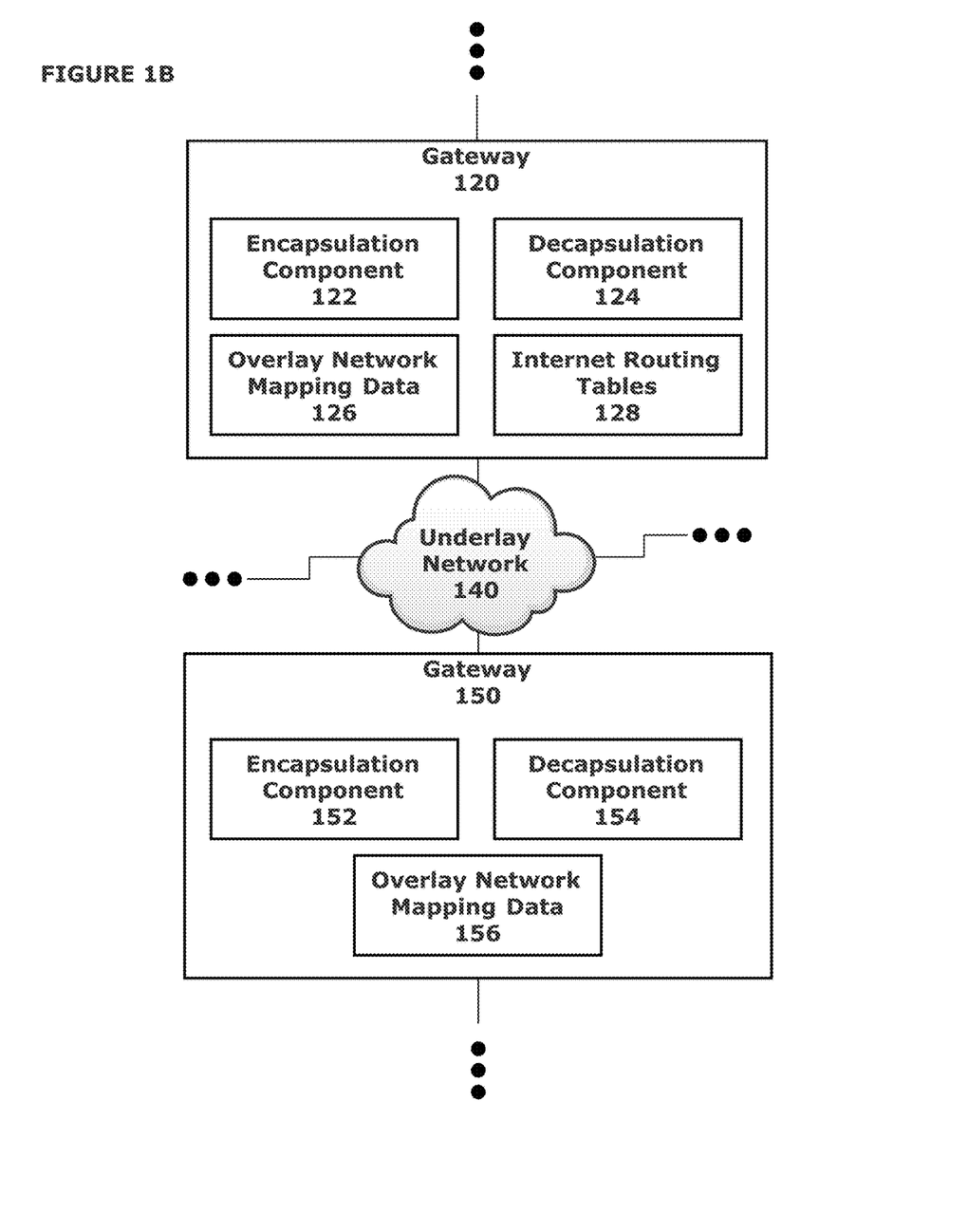

Referring now to FIG. 1B, Gateway 120 stores Internet routing tables 128 which include information on data paths toward various destinations on the Internet. Internet routing tables 128 may be referred to as Internet Virtual Routing and Forwarding (VRF) Forwarding Information Base (FIB). Internet routing tables 128 may include a very large number of routes (for example, some edge gateways store over 2 million routes). As a result, gateway 120 may be a highly complex and relatively expensive device (in comparison to Gateway 150 described below). However, in at least one embodiment, Gateway 120 does not include information for routing to devices within a private tenant network such as device 107 within private tenant network 114. Gateway 120 receives instructions (e.g., an egress interface) on routing a packet addressed to device 107 from redirector 144 as described below with reference to FIG. 3B and FIG. 3C.

In an embodiment, gateway 120 includes functionality for transmitting packets toward destinations within AS 102. Packets received by gateway 120 from outside AS 102 are transmitted via underlay network 140 to devices within AS 102.

Encapsulation component 122, of gateway 120, corresponds to software and/or hardware for encapsulating packets. Gateway 120 encapsulates packets received from outside of AS 102. Gateway 120 transmits the encapsulated packets towards destinations within AS 102. Decapsulation component 124 corresponds to software and/or hardware for decapsulating packets. Gateway 120 decapsulates packets received from devices within AS 102. The process of encapsulating packets and decapsulating packets is described in detail below with respect to FIG. 2.

In an embodiment, gateway 120 stores overlay network mapping data 126 which maps gateways to virtual machines that may be reached via the gateways. In an example, overlay network mapping data 126 maps virtual machine ON1-170 to gateway 150. The mapping is used to determine that packets to be transmitted to ON1-170 are to be transmitted to gateway 150 for forwarding by gateway 150 to ON1-170. The overlay network mapping data 126 further maps ON1-176 to gateway 160. The mapping is used to determine that packets to be transmitted to ON1-176 are to be transmitted to gateway 160 for forwarding by gateway 160 to ON1-176.

In an embodiment, gateway 150 is another gateway within AS 102 that is communicatively coupled with virtual machines (for example, virtual machines ON1-170, ON1-172, ON2-170, and ON3-174). Gateway 150 may correspond to any penultimate programmable node before an ultimate target destination of a packet. In an embodiment, gateway 150 corresponds to or implements a hypervisor or Virtual Machine Monitor (VMM) that creates and runs virtual machines. The device executing the hypervisor may be referred to as a host machine and each virtual machine may be referred to as a guest machine. The hypervisor and corresponding virtual machines may be executed on a same compute node.

In an embodiment, gateway 150 includes encapsulation component 152, decapsulation component 154, and overlay network mapping data 156 which may be substantially similar to above-described encapsulation component 122, decapsulation component 124, and overlay network mapping data 126, respectively. However, the overlay network mapping data 156 and the overlay network mapping data 126 do not necessarily include identical sets of mapping data.

Figure 1C:
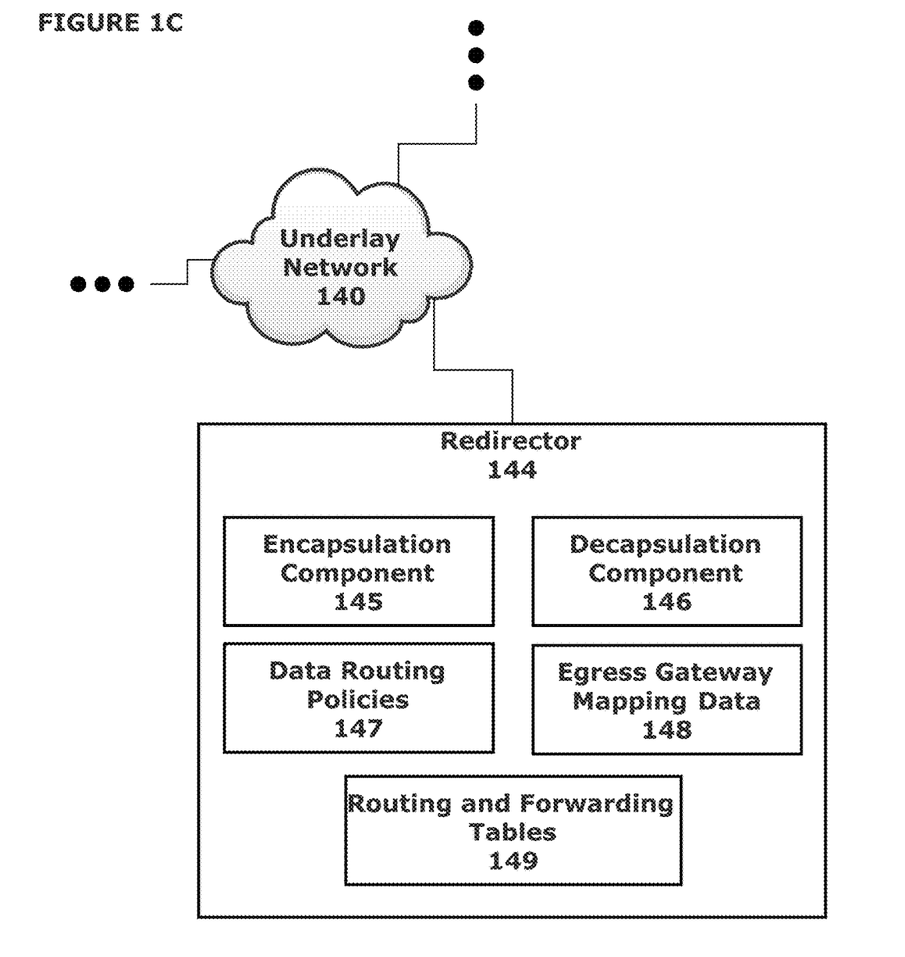

Referring now to FIG. 1A and 1C, AS 102 includes a redirector 144 in accordance with one or more embodiments. The redirector 144 refers to hardware and/or software with functionality to redirect packets propagating within AS 102 to egress gateways for transmission of the packets out of AS 102. In an embodiment, redirector 144 includes functionality to select an egress gateway based one or more of: data routing policies 147, egress gateway mapping data 148, and Routing and Forwarding (RF) tables 149. An example set of operations for redirecting a packet propagating within AS 102 to a selected egress gateway is described below with reference to FIGS. 3A-3C.

In an embodiment, RF tables 149 include routes to or toward destinations within private tenant networks 108 and 114. A RF table 149 as referred to herein includes Virtual Routing and Forwarding (VRF) tables. Each RF table, within a set of RF tables accessible to the redirector 144, corresponds to a respective tenant of a corresponding set of tenants.

A RF table associated with a particular tenant identifies devices within the private tenant network corresponding to the particular tenant. A RF table may map the devices within the private tenant network to tenant network routers which serve as intermediate destinations toward the devices within the private tenant network. The egress gateway mapping data 148 maps the tenant network routers to the egress interfaces of edge gateways of AS 102. Alternatively, a RF table may map the devices within the private tenant network directly to egress interfaces of edge gateways of AS 102. Accordingly, a RF table for a tenant may be used, at least in part, to determine an egress interface of an edge gateway. An egress interface of an edge gateway, as referred to herein, may include but is not limited to a virtual port, a logical port, or a physical port. The egress interface may correspond to a particular VPN IPsec tunnel or other connection endpoint associated with the egress gateway may be identified to transmit a packet out of the AS as described below with reference to FIGS. 3A-3C.

In one example, redirector 144 may store a first RF table corresponding to devices within private tenant network 108 such as device 106. The first RF table is used by redirector 144 to route packets associated with a first tenant corresponding to the private tenant network 108. Redirector 144 may further store a second RF table corresponding to devices within private tenant network 114. The second RF table is used by redirector 144 to route packets associated with a second tenant corresponding to the private tenant network 114. Use of the RF tables by the redirector 144 is described in detail below with reference to FIG. 3B.

In an embodiment, RF tables 149 identify a logical peer for transmitting a set of one or more packets as a function of one or more packet characteristics. Packet characteristics may include, but are not limited to, a final destination, a source device, a source entity, an associated tenant or business entity, a priority, required processing, a signature, and a security/confidentiality level. In one example, a high confidentiality level is indicated in a packet destined for a device within private tenant network 114. A packet with a high confidentiality level requires handling by tenant network router 117. Accordingly, the RF table for the tenant maps high confidentiality level to tenant network router 117.

In an embodiment, each RF table corresponding to any particular tenant may be received by AS 102 from that particular tenant. In an example, an RF table corresponding to a first tenant/private tenant network 108 is received from a device within the private tenant network 108. The tenant network router 116 may transmit the RF table to gateway 120. The RF table is distributed by route reflector 142 to all subscribers of the routing domain corresponding to private tenant network 108. The redirector 144 being a subscriber of the routing domain receives the RF table for the first tenant/private tenant network 108 from route reflector 144.

As stated above, egress gateway mapping data 148 may map tenant network routers to particular egress interfaces of edge gateways. Furthermore, egress gateway mapping data 148 may map other Internet address to specific egress gateways of AS 102. Egress gateway mapping data 148 may be received, by redirector 144, from another device (e.g., Route Reflector 142). Alternatively, egress gateway mapping data 148 may be generated by the redirector 144 by snooping packets propagating within AS 102 that are received from an Internet address external to AS 102. In an example, snooping packets reveals a public IP address of an edge gateway at which a packet is received from a particular Internet address external to AS 102. The redirector 144 generates egress gateway mapping data 158 by mapping the edge gateway to the particular Internet address.

In an embodiment, encapsulation component 145 and decapsulation component 146 are used for encapsulating packets and decapsulating packets, respectively. Encapsulation component 145 and decapsulation component 146 are substantially similar to encapsulation component 122 and decapsulation component 124 described above. In one example, redirector 144 uses the decapsulation component 146 to decapsulate packets propagating with AS 102, while redirector 144 uses the encapsulation component 145 to re-encapsulate the packets for transmission to a selected edge gateway. Inasmuch as the redirector 144 swaps the encapsulation, the redirector 144 may be referred to as an "encapsulation tunnel-swapping middlebox."

Continuing with FIG. 1A, AS 102 includes Route Reflector (RR) 142 in accordance with one or more embodiments. RR 142 corresponds to a network routing component that receives and propagates routes within AS 102. RR 142 may propagate the RF table 149 to the redirector 144. RR 142 may be implemented on a dedicated device or any device within AS 102 that performs other functions. The routes propagated by RR 142 are used by various devices (for example, redirector 144) within AS 102 to transmit packets toward destinations within AS 102 (for example, via underlay network 140). In an embodiment, a separate instance of RR 142 is implemented for each overlay network within AS 102.

3. Encapsulating and Decapsulating Packets

In one or more embodiments, packets are transmitted over the underlay network 140. For example, packets are transmitted between redirector 144 and gateway 120. A transmitting device encapsulates the packet before transmission over the underlay network 140. A receiving device decapsulates the packet after receipt. In one example, redirector 144 selects gateway 120 as an egress node for transmission of a packet out of AS 102. By encapsulating the packet, redirector 144 hides the destination of the packet. Redirector 144 advantageously ensures that (a) none of the intermediate nodes between redirector 144 and gateway 120 can modify the selection of the gateway 120 as an egress node and (b) none of the intermediate nodes require routing tables for routing based on the destination address hidden in the payload of the encapsulated inner packet.

Figure 2:
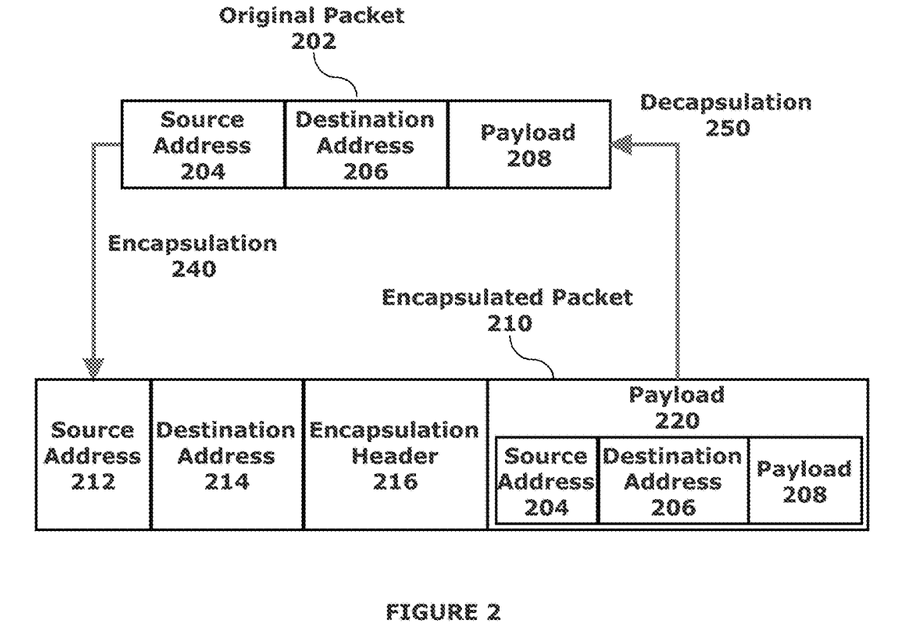
FIGS. 2 and 3A-3C illustrate various operations in accordance with one or more embodiments.

FIG. 2 illustrates the basic elements of an encapsulated packet and the basic elements of the original packet (or decapsulated packet) in accordance with one or more embodiments. The illustrated elements are selected for purposes of clarity and explanation. Embodiments may include more or fewer elements than the illustrated elements.

As illustrated in FIG. 2, an original packet 202 includes a source address 204, a destination address 206, and a payload 208. The source address 204 and destination address 206 are included in a portion of the packet 202 referred to as a packet header. The packet header is separate from the packet payload 208. A source address 204 identifies a source or sender of the packet. If the source address is an IP address, the source address is referred to herein as Source IP (SIP). In one example, a source address, of a packet transmitted from an AS to a device on the Internet, corresponds to the public IP address of a gateway at the edge of the AS that transmitted the packet out of the AS. However, an actual source of the packet is a virtual machine executing on a compute node inside of the AS.

A destination address 206 identifies a destination to which the packet is to be transmitted. The destination address 206 corresponds to a final destination of the packet or to an intermediate destination from which the packet is forwarded toward the final destination. In one example, once a packet is received at an intermediate device corresponding to the destination address 206, the intermediate device performs a Network Address Translation (NAT) to determine a final destination for the packet. The intermediate device modifies the destination field of the packet to the final destination, and forwards the packet to the final destination.

In an embodiment, original packet 202 includes a payload 208 corresponding to a cargo of a packet or data transmission. The data in original packet 202 may be aggregated, by a receiving device, with data in other packets to obtain a content item.

In an embodiment, encapsulation (Operation 240) is a process by which the original packet 202 is encapsulated within an outer packet. The original packet 202 is referred to as an inner packet encapsulated within the outer packet. Various different protocols may be used for encapsulating the packet including, for example, the VXLAN protocol and the GRE protocol referenced above. During the encapsulation process, one or more packet headers are added to the front of the original packet 202.

The resulting encapsulated packet 210 includes payload 220 with the original packet 202 and a new header(s). The header on the encapsulated packet 210 (referred to herein as an outer header) includes a source address 212 and a destination address 214. In an example, source address 212 corresponds to a SIP, while destination address 214 corresponds to a DIP. Source address 212 and destination address 214 are referred to herein as the outer source address and outer destination address, respectively. Source address 204 and destination address 206 are referred to herein as the inner source address and inner destination address, respectively.

In an embodiment, encapsulated packet 210 includes an encapsulation header 216 corresponding to an overlay network. The encapsulation header 216 includes an identifier corresponding to the overlay network and an identifier corresponding to the specific target entity on the overlay network. In one example, an encapsulation header includes Overlay Network Identifier "15" corresponding to a particular overlay network. The encapsulation header further includes a destination MAC address of the virtual machine that is the final destination for original packet 202 included within the payload of the particular encapsulated packet.

In an embodiment, decapsulation (Operation 250) is a process by which outer header(s) of the encapsulated packet 210 are stripped off to obtain the original packet 202. Decapsulating an encapsulated packet results in extracting the inner packet, i.e., original packet 202 from the payload 220 of the encapsulated packet 210.

4. Redirecting Packets in an Autonomous System to an Egress Gateway

Figure 3A:
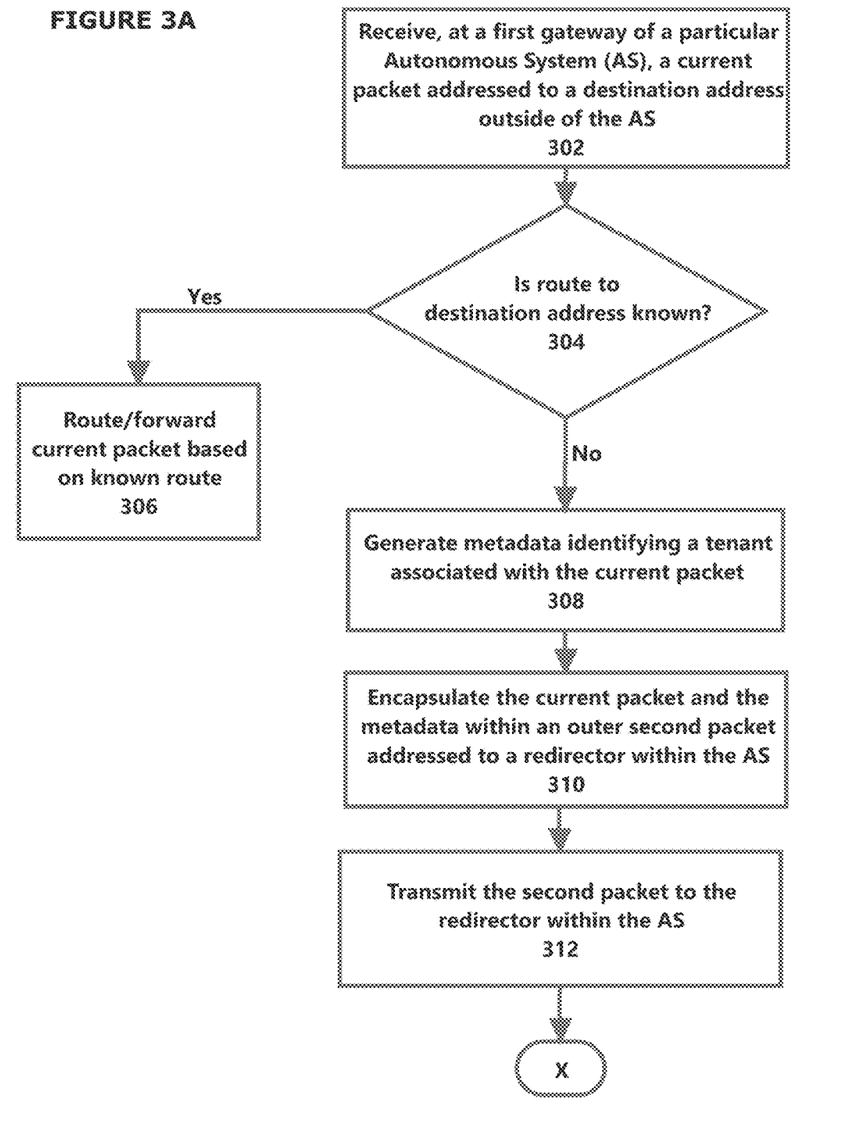
Figure 3B:
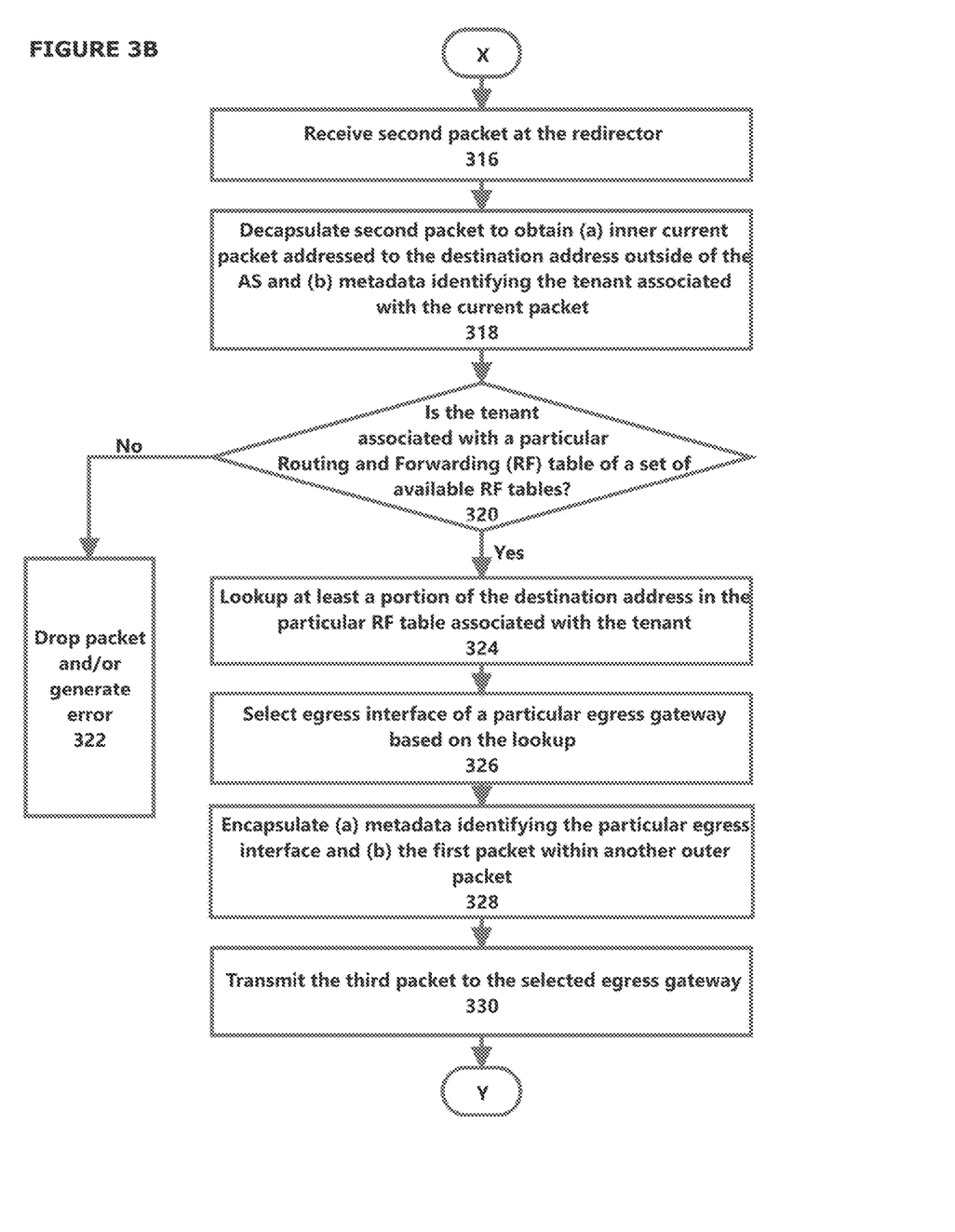
Figure 3C:
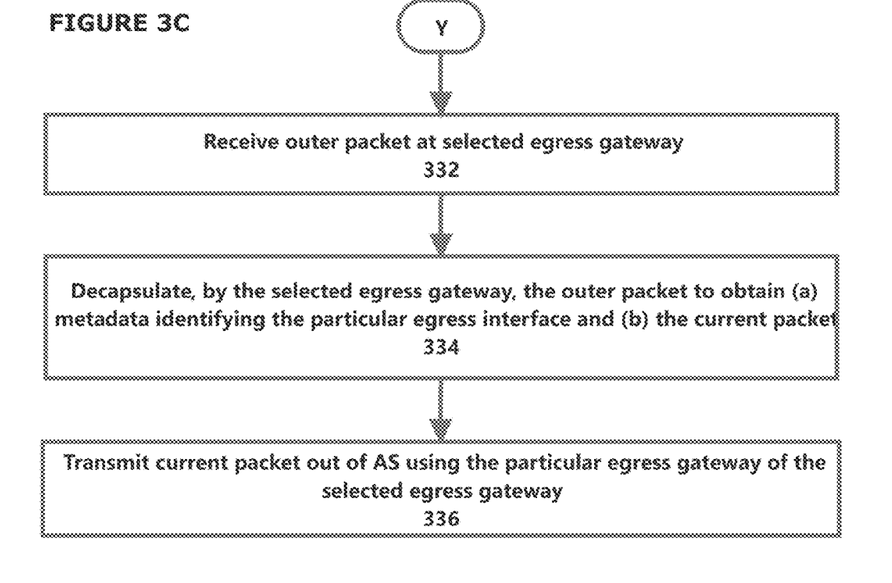

FIGS. 3A-3C illustrate an example set of operations for redirecting packets in an AS to an egress gateway in accordance with one or more embodiments. One or more operations illustrated in FIGS. 3A-3C may be modified, rearranged, or omitted all together. Accordingly, the particular sequence of operations illustrated in FIG. 3A-3C should not be construed as limiting the scope of one or more embodiments.

Initially, a current packet may be received at a first gateway (e.g., internal gateway) within an AS (Operation 302). The current packet may be received by the first gateway from a virtual machine. The current packet may be related to or responsive to a packet previously received by the virtual machine. The current packet includes a destination address external to the AS. For example, the current packet may include a destination address corresponding to a private address in a private tenant network outside of the AS. The current packet may include a Layer 2 Media Access Control (MAC) address as a destination address. The Layer 2 MAC address may correspond to a device in a private tenant network outside of the AS.

The first gateway may determine if a route to the destination address of the current packet is known (Operation 304). If the route is known, the first gateway may forward or route the current packet based on the known route (Operation 306). In one example, the current packet is received from a first VM managed by the first gateway and addressed to a second VM managed by the first gateway. The first gateway forwards the current packet to the second VM. In another example, the current packet is addressed to a second VM that is managed by a second gateway different than the first gateway. In this example, the first gateway forwards the current packet to the second gateway for forwarding on to the second VM.

In an embodiment, the first gateway does not include the information necessary to route or forward the current packet. For example, the current packet is addressed to a private address in a private tenant network outside of the AS. The first gateway does not include information identifying the route to the destination address corresponding to the private tenant network. Responsive to determining that the route or forwarding path to the destination address is not known, the first gateway determines that the current packet must be transmitted to redirector within the AS.

In an embodiment, the first gateway generates metadata identifying a tenant associated with the current packet (Operation 308). In an example, the first gateway identifies the tenant associated with the current packet based on the source of the current packet. If the current packet is received from a VM associated with a particular tenant, then the current packet is determined to be associated with the particular tenant.

In an embodiment, the first gateway may encapsulate the current packet and the metadata identifying the tenant inside of an outer packet (Operation 310). The outer packet is addressed to a redirector within the AS. The first gateway then transmits the outer packet to the redirector within the AS (Operation 312). The outer packet is transmitted over an underlay network via intermediate devices. Encapsulation of the current packet within the outer packet hides the destination address of the current packet from the intermediate devices within the underlay network. Accordingly, the intermediate devices only require functionality to route the packet to the redirector within the AS. While the intermediate devices may store Internet routing tables in some embodiments; advantageously, the Internet routing tables are not required to transmit the outer packet from the first gateway to the redirector.

The outer packet, transmitted by the first gateway via the underlay network, may be received at the redirector (Operation 316). The redirector decapsulates the outer packet obtain (a) the inner current packet and (b) the metadata identifying the tenant associated with the current packet (Operation 318). The process for decapsulation is described above with reference to FIG. 2.

In an embodiment, the redirector may determine if the identified tenant is associated with a particular Routing and Forwarding (RF) table of a set of available RF tables corresponding to a respective set of tenants (Operation 320). The redirector maintains or includes functionality to access a set of RF tables. Each of the RF tables is associated with a respective tenant of a set of tenants. An RF table associated with a particular tenant is used when routes or forwarding paths are to be determined for packets associated with the particular tenant. In an example, an identifier associated with the tenant (associated with the current packet) is compared to identifiers or metadata associated with each of the set of available RF tables. If the identifier associated with the tenant matches an identifier or metadata associated with a particular RF table, then the particular RF table is determined to be associated with the tenant. If no match is found, then packet may be dropped and/or an error may be generated (Operation 322). The error indicates that information for routing or forwarding the packet is unavailable.

In an embodiment, a lookup of at least a portion of the destination address of the current packet is executed on the particular RF table associated with the tenant (Operation 324). In one example, the destination address is a private IP address that is implemented within many different private tenant networks. The private IP address is mapped to different sets of information within different RF tables. Accordingly, correctly identifying the RF table corresponding specifically to the tenant, associated with the current packet, is necessary to identify the correct forwarding or routing information for the current packet. In this example, the private IP address is compared to IP addresses within the particular RF table using Longest Matching Prefix (LMP) techniques. In another example, the destination address is a Layer 2 MAC address which is searched for within the RF table to identified the correct forwarding or routing information.

In an embodiment, the lookup of the destination address (or other attribute) of the current packet within the associated tenant's RF table results in identification of a tenant network router to which the current packet is to be transmitted. Examples of other attributes of the current packet which may be used for routing include but are not limited to: a priority level, a confidentiality level, a source address, a source entity, and a type of processing required for the current packet.

A second lookup of the tenant network router in another table results in identification of a particular egress interface of an egress gateway. The egress gateway is selected for transmitting the current packet out of the AS. The particular egress interface corresponds to an interface of the selected egress gateway that is communicatively coupled to the tenant network router. The particular egress interface may correspond to a hardware interface, a software interface, or a combination thereof. Examples of egress interfaces include but are not limited to physical ports, virtual ports, logical ports, connection endpoints, application ports, etc.

Instead of or in addition to the multiple lookup process described above, some embodiments may include a single lookup process. In a single lookup process, the RF table maps the destination address of the current packet directly to the particular egress interface of the selected egress gateway.

In an embodiment, the redirector encapsulates (a) metadata identifying the particular egress interface and (b) the current packet within another outer packet (Operation 328). Encapsulation is described above with respect to FIG. 2. Furthermore, the redirector transits the outer packet to the selected egress gateway (Operation 330). The outer packet is addressed to the particular egress gateway. The outer packet is transmitted over an underlay network. The destination address of the inner current packet is again hidden from any intermediate devices within the underlay network. As a result, the intermediate devices within the underlay network only route the outer packet based on a destination address of the outer packet.

The selected egress gateway receives the outer packet from the redirector (Operation 332). The selected egress gateway decapsulates the outer packet to obtain (a) metadata identifying the particular egress interface and (b) the current packet (Operation 334). Decapsulation is described above with respect to FIG. 2.

In an embodiment, the selected egress gateway transmits the current packet out of the AS using the particular egress interface identified in the metadata (Operation 336). Transmitting the current packet out of the particular egress interface may include re-encapsulating the current packet within another outer packet. The outer packet is transmitted out of the particular egress interface.

In one example, the particular egress interface corresponds directly or indirectly to a first endpoint of a VPN IPsec tunnel. The current packet is encapsulated within an outer packet that is addressed to the other endpoint of the VPN IPsec tunnel. The outer packet is then encrypted and transmitted out of the AS toward the other endpoint of the VPN IPsec tunnel.

In another example, the particular egress interface corresponds to a physical port of the selected egress gateway. The current packet is transmitted out of the selected egress gateway. The current packet may be encapsulated within an outer packet before transmission out of the physical port.

In an embodiment, the particular egress interface, to be used by the select egress gateway to transmit the current packet, is not received with the current packet from the redirector. The redirector may instead transmit an identifier of the tenant network router, an intermediate destination toward the final destination on the private tenant network. The selected egress gateway performs a lookup based on the identifier of the tenant network router. The look up, by the selected egress gateway, results in identification of the egress interface of the selected egress gateway that is communicatively coupled to the tenant network router. The selected egress gateway then transmits the current packet (may or may not be encapsulated within an outer packet) out of the AS via the identified egress interface.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

127

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), Network Processing Units (NPUs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, NPUs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
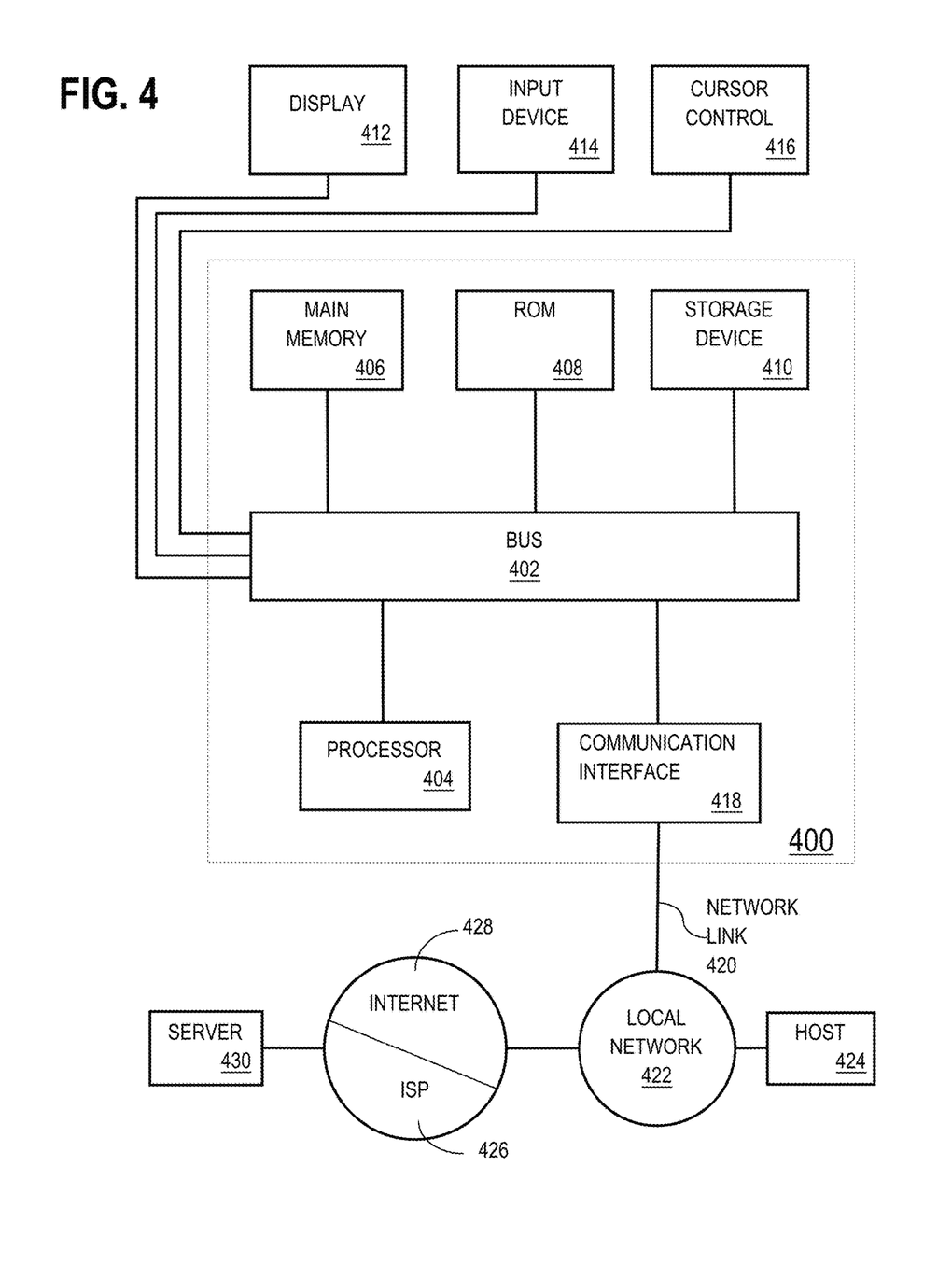
FIG. 4 illustrates a system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs, NPUs, or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   obtaining, by a device inside an Autonomous System (AS), a current packet addressed to a private IP address, the private IP address being a valid IP address in at least two private tenant networks of a plurality of private tenant networks outside of the AS;
   determining that the current packet is associated with a first tenant of a plurality of tenants associated respectively with the plurality of private tenant networks;
   responsive to determining that the current packet is associated with a first tenant:
      selecting a Routing and Forwarding (RF) table, associated with the first tenant, from a plurality of RF tables associated respectively with the plurality of tenants;
   based at least on a lookup of the private IP address in the selected RF table associated with the first tenant: selecting a particular edge gateway of the AS as an egress gateway for transmitting the current packet out of the AS;
   re-encapsulating the current packet within a second packet addressed to the particular edge gateway; and transmitting, by the device, the second packet to the particular edge gateway.

2. The medium of claim 1, wherein the second packet comprises an identifier of an egress interface, of the particular edge gateway, that is to be used to transmit the second packet out of the AS.

3. The medium of claim 1,
wherein selecting the particular edge gateway based on the lookup of the private IP address comprises:
determining that the private IP address is mapped, in the selected RF table, to a first tenant network router of a first private tenant network associated with the first tenant;
determining that an egress interface of the particular edge gateway is communicatively coupled to the first tenant network router; and
wherein the operations further comprise:
causing transmission of the second packet out of the AS via the egress interface of the particular edge gateway by transmitting an identifier of the egress interface in the second packet to the particular edge gateway.

4. The medium of claim 3, wherein causing transmission of the second packet out of the AS via the egress interface of the particular edge gateway results in transmission of the second packet toward the private IP address of the first private tenant network.

5. The medium of claim 3, wherein the particular edge gateway receives the second packet, decapsulates the second packet to obtain the current packet, and transmits the current packet out of the first AS using the egress interface corresponding to the identifier in the second packet.

6. The medium of claim 3,
wherein the first tenant network router is one of two or more tenant network routers of the first private tenant network that are communicatively coupled to the AS, and
wherein transmission of the second packet out of the AS via the egress interface of the particular edge gateway causes transmission of the second packet to the first tenant network router.

7. The medium of claim 1, wherein the second packet comprises metadata specifying a first tenant network router of a first private tenant network associated with the first tenant.

8. The medium of claim 1,
wherein the AS comprises two or more edge gateways that are communicatively coupled with a private tenant network associated with the first tenant,
wherein the particular edge gateway is selected from a plurality of edge gateways comprising the two or more edge gateways.

9. The medium of claim 1, wherein the device is a redirector implemented within the AS.

10. The medium of claim 1, wherein obtaining the current packet comprises
receiving, by the device from a second device within the AS, a third packet encapsulating a current packet; and
decapsulating, by the device, the third packet to obtain the current packet.

11. A system comprising:
a device including a hardware processor;
the system being configured to perform operations comprising:
obtaining, by a device inside an Autonomous System (AS), a current packet addressed to a private IP address, the private IP address being a valid IP address in at least two private tenant networks of a plurality of private tenant networks outside of the AS;
determining that the current packet is associated with a first tenant of a plurality of tenants associated respectively with the plurality of private tenant networks;
responsive to determining that the current packet is associated with a first tenant:
selecting a Routing and Forwarding (RF) table, associated with the first tenant, from a plurality of RF tables associated respectively with the plurality of tenants;
based at least on a lookup of the private IP address in the selected RF table associated with the first tenant: selecting a particular edge gateway of the AS as an egress gateway for transmitting the current packet out of the AS;
re-encapsulating the current packet within a second packet addressed to the particular edge gateway; and
transmitting, by the device, the second packet to the particular edge gateway.

12. The system of claim 11, wherein the second packet comprises an identifier of an egress interface, of the particular edge gateway, that is to be used to transmit the second packet out of the AS.

13. The system of claim 11,
wherein selecting the particular edge gateway based on the lookup of the private IP address comprises:
determining that the private IP address is mapped, in the selected RF table, to a first tenant network router of a first private tenant network associated with the first tenant;
determining that an egress interface of the particular edge gateway is communicatively coupled to the first tenant network router; and
wherein the operations further comprise:
causing transmission of the second packet out of the AS via the egress interface of the particular edge gateway by transmitting an identifier of the egress interface in the second packet to the particular edge gateway.

14. The system of claim 13, wherein causing transmission of the second packet out of the AS via the egress interface of the particular edge gateway results in transmission of the second packet toward the private IP address of the first private tenant network.

15. The system of claim 13, wherein the particular edge gateway receives the second packet, decapsulates the second packet to obtain the current packet, and transmits the current packet out of the first AS using the egress interface corresponding to the identifier in the second packet.

16. The system of claim 13,
wherein the first tenant network router is one of two or more tenant network routers of the first private tenant network that are communicatively coupled to the AS, and
wherein transmission of the second packet out of the AS via the egress interface of the particular edge gateway causes transmission of the second packet to the first tenant network router.

17. The system of claim 11, wherein the second packet comprises metadata specifying a first tenant network router of a first private tenant network associated with the first tenant.

18. The system of claim 11,
wherein the AS comprises two or more edge gateways that are communicatively coupled with a private tenant network associated with the first tenant, wherein the particular edge gateway is selected from a plurality of edge gateways comprising the two or more edge gateways.

19. The system of claim 11, wherein obtaining the current packet comprises
   receiving, by the device from a second device within the AS, a third packet encapsulating a current packet; and
   decapsulating, by the device, the third packet to obtain the current packet.

20. A method comprising:
   obtaining, by a device inside an Autonomous System (AS), a current packet addressed to a private IP address, the private IP address being a valid IP address in at least two private tenant networks of a plurality of private tenant networks outside of the AS;
   determining that the current packet is associated with a first tenant of a plurality of tenants associated respectively with the plurality of private tenant networks;
   responsive to determining that the current packet is associated with a first tenant:
      selecting a Routing and Forwarding (RF) table, associated with the first tenant, from a plurality of RF tables associated respectively with the plurality of tenants;
   based at least on a lookup of the private IP address in the selected RF table associated with the first tenant: selecting a particular edge gateway of the AS as an egress gateway for transmitting the current packet out of the AS;
   re-encapsulating the current packet within a second packet addressed to the particular edge gateway;
   transmitting, by the device, the second packet to the particular edge gateway; and
   wherein the device comprises a hardware processor.

* * * * *

UNITED STATES PATENT AND TRADEMARK OFFICE
CERTIFICATE OF CORRECTION

PATENT NO. : 9,860,079 B2
APPLICATION NO. : 14/947921
DATED : January 2, 2018
INVENTOR(S) : Cohn et al.

Page 1 of 1

It is certified that error appears in the above-identified patent and that said Letters Patent is hereby corrected as shown below:

In the Specification

In Column 1, Line 53, delete "as—to" and insert -- ASs to --, therefor.

In Column 1, Line 55, delete "as—is" and insert -- ASs is --, therefor.

In Column 3, Line 46, delete "device" and insert -- device. --, therefor.

In Column 7, Line 62, delete "FIG." and insert -- FIGS. --, therefor.

In Column 11, Line 8, delete "FIG." and insert -- FIGS. --, therefor.

In Column 12, Line 46, delete "identified" and insert -- identify --, therefor.

In Column 14, Line 14, below "correction." delete "127".

Signed and Sealed this
Sixth Day of November, 2018

Andrei Iancu
*Director of the United States Patent and Trademark Office*